US011593386B2

(12) United States Patent
Umeda

(10) Patent No.: US 11,593,386 B2
(45) Date of Patent: Feb. 28, 2023

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Sawako Umeda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 235 days.

(21) Appl. No.: 17/035,614

(22) Filed: Sep. 28, 2020

(65) Prior Publication Data

US 2021/0286820 A1    Sep. 16, 2021

(30) Foreign Application Priority Data

Mar. 13, 2020   (JP) .............................. JP2020-043847

(51) Int. Cl.
*G06F 16/2457*    (2019.01)
*G06F 16/93*    (2019.01)

(52) U.S. Cl.
CPC ........ *G06F 16/24578* (2019.01); *G06F 16/93* (2019.01)

(58) Field of Classification Search
CPC .. G06F 16/951; G06F 16/9535; G06F 16/248; G06F 16/93; G06F 16/24578; G06F 3/04842; G06F 16/48; G06F 16/245; G06F 16/13; G06F 16/58; G06F 16/907; G06F 16/22; G06F 16/51; G06F 3/0481; G06F 16/5866; G06F 16/583; G06F 16/2228; G06F 16/9038; G06F 16/10; G06F 16/338; G06F 16/164; G06F 16/41; G06F 16/38; G06F 16/24; G06F 16/683; G06F 11/1435; G06F 16/538; G06F 16/3325

See application file for complete search history.

(56) References Cited

U.S. PATENT DOCUMENTS 8,473,471 B2    6/2013   Nagai
2006/0080316 A1*   4/2006   Gilmore .............. G06F 21/6218
707/999.009

FOREIGN PATENT DOCUMENTS

JP    2008027134    2/2008
JP    2010102593    5/2010

* cited by examiner

*Primary Examiner* — Hau H Hoang
(74) *Attorney, Agent, or Firm* — JCIPRNET

(57) ABSTRACT

An information processing apparatus includes a memory storing, in an associated form, attribute information assigned to a document and information that indicates whether the attribute information is first attribute information that a user is not enabled to assign or second attribute information that the user is enabled to assign and one or multiple processors configured to perform first search on the attribute information on the document using the first attribute information in a search formula and second search on the attribute information on the document using the second attribute information in the search formula.

8 Claims, 14 Drawing Sheets

FIG. 8

| 805 | 810 | 815 | 820 | 825 | 830 | 835 | 840 | 845 | 850 |
|---|---|---|---|---|---|---|---|---|---|
| DOCUMENT ID | DOCUMENT NAME | DOCUMENT CREATOR | DATE OF DOCUMENT CREATION | DATA FORM | EXPIRATION DATE | DOCUMENT TYPE | TITLE | NAME OF PERSON IN CHARGE | AMOUNT |
| | | | | | | | | | |

| DOCUMENT ID (905) | NUMBER OF ATTRIBUTES A (910) | NUMBER OF ATTRIBUTES B (915) | PRIORITY ORDER (920) |
|---|---|---|---|
| 0003 | 2 | 1 | 3 |
| 0005 | 2 | 2 | 2 |
| 0001 | 1 | 3 | 4 |
| 0007 | 0 | 4 | NOT HIT |
| 0011 | 3 | 0 | 1 |

| DOCUMENT ID (1005) | NUMBER OF ATTRIBUTES B (1010) | PRIORITY ORDER (1015) |
|---|---|---|
| 0022 | 5 | 2 |
| 0031 | 3 | 3 |
| 0043 | 0 | NOT HIT |
| 0055 | 10 | 1 |

| KEY | VALUE EXTRACTION RULE |
|---|---|
| BILLING NUMBER | EXTRACT, AS "INVOICE NUMBER," ALPHANUMERICAL LETTERS OF 10 DIGITS TO THE RIGHT OF "BILLING NUMBER" |
| ⋮ | |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-043847 filed Mar. 13, 2020.

BACKGROUND

(i) Technical Field

The present disclosure relates to an information processing apparatus and a non-transitory computer readable medium.

(ii) Related Art

Japanese Unexamined Patent Application Publication No. 2008-027134 discloses a configuration that increases the efficiency of search with a workload on a user reduced at a user registration. The configuration includes a search result display unit, a target operation determination unit, a keyword extraction unit, and an index registration unit. The search result display unit searches an item, such as a document or a folder, in response to a keyword specified by a user, displays an item extracted as a result of the search, and receives a user operation performed on the item. If the user performs an operation on the item displayed on the search result display unit, the target operation determination unit determines whether the operation performed is an operation that is registered beforehand. If determination results provided by the target operation determination unit are correct, the keyword extraction unit extracts a keyword related to the item from among the keywords specified in the searching. The index registration unit registers the keyword extracted by the keyword extraction unit as an index of the item.

Japanese Unexamined Patent Application Publication No. 2010-102593 discloses an information processing apparatus that increases a search accuracy by conferring an appropriate attribute value to search target data in a manner such that a user is not involved in complex jobs. The information processing apparatus includes a receiving unit, a presentation unit, and an update unit. The receiving unit receives designates of multiple types of attribute values indicating characteristics of the data. Out of multiple pieces of data and attribute values thereof stored on a memory, the presentation unit selectively displays data having characteristics matching at least one of the attribute values with the designate thereof received by the receiving unit. In accordance with the attribute value with the designate thereof received by the receiving value, the update unit updates the attribute value of the data selected by the user and stored on the memory from the data presented on the presentation unit.

When search is performed using attribute information assigned to a document, the attribute information is uniformly used regardless of whether or not the user is enabled to assign the attribute information. For this reason, retrieval omission or search noise may occur.

SUMMARY

Aspects of non-limiting embodiments of the present disclosure relate to providing an information processing apparatus and a non-transitory computer readable medium controlling, when searching is made using attribute information assigned to a document, the occurrence of a retrieval omission or search noise more than when searching is made using uniformly the attribute information regardless of whether or not a user is enabled to assign the attribute information.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus. The information processing apparatus incudes a memory storing, in an associated form, attribute information assigned to a document and information that indicates whether the attribute information is first attribute information that a user is not enabled to assign or second attribute information that the user is enabled to assign, and one or a plurality of processors configured to perform first search on the attribute information on the document using the first attribute information in a search formula and second search on the attribute information on the document using the second attribute information in the search formula.

BRIEF DESCRIPTION OF THE DRAWINGS

Exemplary embodiment of the present disclosure will be described in detail based on the following figures, wherein:

FIG. 8 illustrates a data structure of a document management table;

FIG. 9 illustrates a data structure of a priority order determination table;

FIG. 10 illustrates a data structure of the priority order determination table;

FIG. 15 illustrates a data structure of a key and value extraction table;

DETAILED DESCRIPTION

Exemplary embodiment of the disclosure is described with reference to the drawings.

Figure 1:
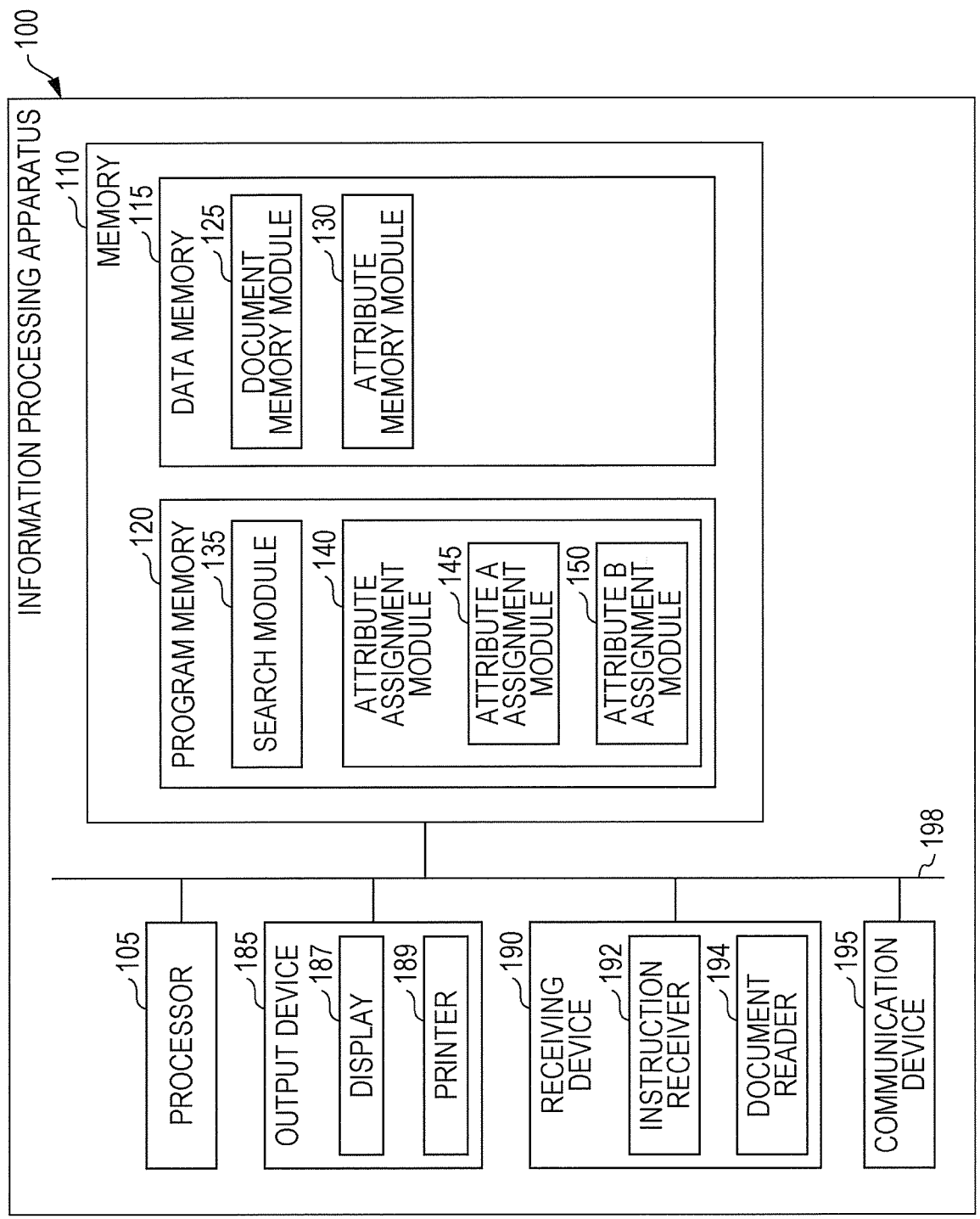
FIG. 1 illustrates a conceptual modular configuration of an exemplary embodiment.

FIG. 1 illustrates a conceptual modular configuration of the exemplary embodiment. The term "module" refers to a software component (including a computer program) that is logically separable, or a hardware component. The module of the exemplary embodiment refers to not only a module in a computer program but also a module in a hardware configuration. The discussion of the exemplary embodiment also serves as the discussion of a system, method, and computer programs for causing the modules to function (including a program that causes a computer to execute each step, a program that causes the computer to function as an element, and a program that causes the computer to implement each function). In the discussion that follows, the phrases "stores information," "causes information to be stored," and other phrases equivalent thereto are used. If the exemplary embodiment is a computer program, these phrases are intended to express "causes a memory device to store information" or "controls a memory device to cause the memory device to store information." The modules may correspond to the functions in a one-to-one correspondence. In software implementation, one module may be configured of one program or multiple modules may be configured of one program. One module may be configured of multiple programs. Multiple modules may be executed by a single computer. A single module may be executed by multiple computers in a distributed environment or a parallel environment. One module may include another module.

In the discussion that follows, the term "connection" refers to not only a physical connection but also a logic connection (such as an exchange of data, instructions, data reference relationship, or login).

The term "predetermined" means that something is decided in advance of a process of interest. The term predetermined is thus intended to refer to something that is decided in advance of a process of interest in the exemplary embodiment. Even after a process in the exemplary embodiment has started, the term predetermined refers to something that is decided in advance of a process of interest depending on a condition or a status of the exemplary embodiment at the present point of time or depending on a condition or status of the exemplary embodiment heretofore continuing down to the present point of time. If plural predetermined values are used, the predetermined values may be different from each other, or two or more of the predetermined values (including all the values) may be equal to each other.

A statement that "if A, B is to be performed" is intended to mean that it is determined whether something is A, and that if something is determined as A, an action B is to be taken. The statement becomes meaningless if the determination as to whether something is A is not performed. If a discussion is made of events "A, B, and C," the discussion is applicable to at least one of the events "A, B, and C" unless otherwise noted. For example, the discussion is applicable to the case in which only the event A is selected.

The term "system" and the term "apparatus" refer to an arrangement where multiple computers, a hardware configuration, and an apparatus are interconnected via a communication network (including a one-to-one communication connection). The term system and the term apparatus also refer to an arrangement that includes a single computer, a hardware configuration, and an apparatus. The term system and the term apparatus have the same definition and are interchangeable with each other. The system in the context of the exemplary embodiment does not include a social system that is a social arrangement formulated by humans.

At each process performed by a module, or at one of the processes performed by a module, information as a process target is read from a memory device, the information is then processed, and the process results are written onto the memory device. A description related to the reading of the information from the memory device prior to the process and the writing of the processed information onto the memory device subsequent to the process may be omitted as appropriate.

An information processing apparatus 100 of the exemplary embodiment has a search function using attribute information assigned to a document. Referring to FIG. 1, the information processing apparatus 100 includes at least a processor 105 and memory 110 and further includes a bus 198 through which data is exchanged therebetween. The information processing apparatus 100 may further include an output device 185, receiving device 190, and communication device 195. Data is exchanged via the bus 198 among the processor 105, memory 110, output device 185, receiving device 190, and communication device 195.

The block diagram in FIG. 1 also illustrates a hardware configuration of a computer that implements the exemplary embodiment. The computer hardware executing a program of the exemplary embodiment is a computer illustrated in FIG. 1 and is typically a computer, such as a personal computer or server. Specifically, the information processing apparatus 100 employs the processor 105 and the memory 110 as a storage device.

One or more processors 105 may be employed. The processor 105 may include a central processing unit (CPU) or a microprocessor. If multiple processors 105 are employed, they may be a tightly or loosely coupled multiprocessor. For example, a single processor 105 may include multiple processor cores. Alternatively, a system including multiple computers linked via a communication network and functioning like a virtual single computer may be employed. The system may be a loosely coupled multiprocessor that is constructed as a cluster system or a computer cluster. The processor 105 executes a program on the program memory 120.

The memory 110 may include a semiconductor memory, such as a register or a cache memory in the processor 105 or a memory, such as a random-access memory (RAM) or a read-only memory (ROM). The memory 110 may also be an internal memory device, such as a hard disk drive (HDD) or a solid-state drive (SSD), each functioning as a persistent memory, or an external memory device or an auxiliary memory device, such as a compact disc (CD), or digital versatile disc (DVD), Blu-ray (registered trademark) disc, universal serial bus (USB) memory, memory card or other external storage device or other auxiliary memory device. The memory 110 may also be a memory device of a server connected to the information processing apparatus 100 via a communication network.

The memory 110 includes a data memory 115 storing data and a program memory 120 storing programs. The program memory 120 and the data memory 115 may store programs of the modules illustrated in FIG. 1, programs such as an operating system to start up the computer, and data, such as parameters that appropriately vary in the execution of the modules.

The output device 185 includes a display 187 and printer 189. The display 187 may be a liquid-crystal display, organic electroluminescent (EL) display, or three-dimensional display and displays, in text or image, process results from the processor 105 and data on the data memory 115. The printer 189 may be a printer or a multi-function device and prints the process results from the processor 105 and data on the data memory 115. The output device 185 may also include a speaker and actuator to vibrate the device.

The receiving device 190 includes an instruction receiver 192 and document reader 194. The instruction receiver 192 is a keyboard, mouse, microphone, camera (including eye-gaze detection camera) or other device. The instruction receiver 192 receives data (manual operation, voice, or gaze) that is based on user operation performed on one of these devices.

A touch screen serving the functions of both the display 187 and the instruction receiver 192 may be used. In such a case, without the physical presence of keys, the keyboard function may be implemented by drawing a keyboard (called a software keyboard or a screen keyboard) on the touch screen using software.

The display 187 and instruction receiver 192 are used as a user interface.

The document reader 194 serving as a scanner or camera receives, as a document file, image data that is generated by reading or photographing a document.

The communication device 195 is a communication network interface used to connect to another apparatus via a communication network.

The exemplary embodiment related to a computer program is implemented when the computer program as a software resource is read onto the program memory 120 as a hardware resource and the software and hardware resources cooperate with each other.

The hardware configuration in FIG. 1 is illustrated for exemplary purposes only. The exemplary embodiment is not limited to the configuration illustrated in FIG. 1 and is acceptable as long as the configuration implements the modules of the exemplary embodiment. For example, the processor 105 may include a graphics processing unit (GPU) (including general-purpose computing on graphics processing unit (GPGPU)). The processor 105 may be a dedicated hardware resource (such as application specific integrated circuit (ASIC)) that executes part of the modules or field-programmable gate array (FPGA) that is reconfigurable integrated circuit. Part of the modules may be in an external system that is connected to the information processing apparatus 100 via a communication network.

Multiple of the system in FIG. 1 may be operatively coupled via a communication network. The system in FIG. 1 may be incorporated in a personal computer, portable information communication apparatus (such as cellular phone, smart phone, mobile device, or wearable computer), information appliance, robot, copier, fax, scanner, printer, or multi-function apparatus (an image processing apparatus having at least two of scanner function, printer function, copier function, and fax function).

The processor 105 is connected to the memory 110, output device 185, receiving device 190, and communication device 195 via the bus 198. The processor 105 executes a process in accordance with the computer program that describes an execution sequence of each module and stored on the program memory 120. For example, in response to the event when the document file reader 194 receives an image of an document or in response to the event when the instruction receiver 192 receives a user operation, the processor 105 performs the process of a module on the program memory 120 corresponding to the event, causes the data memory 115 to store the process results, outputs the process results to the display 187, or transmits the process results to another apparatus by controlling the communication device 195.

The memory 110 includes the data memory 115 and program memory 120 and is connected to the processor 105, output device 185, receiving device 190, and communication device 195 via the bus 198.

The data memory 115 includes a document memory module 125 and attribute memory module 130.

The document memory module 125 stores a document. The document (also referred to as a file) may be text data, numerical data, graphic data, image data, video data, audio data or a combination thereof. The document serves as a target of storage, editing, and search and is an individual unit that is exchanged between systems or users. The document may include anything similar to what is described herein. Specifically, the document is a document created by a document creation program (so-called a word processor), an image read by an image reader (such as a scanner), and a web page.

The attribute memory module 130 stores attribute information assigned to a document. The attribute information serves as a search target and is used to search the document. The attribute information is divided in two types. A first type is first attribute information that a user is not enabled to assign and a second type is second attribute information that the user is enabled to assign. Specifically, the attribute memory module 130 stores, in an associated form, the attribute information assigned to the document and information that indicates whether the attribute information is the first attribute information or the second attribute information. The information that indicates whether the attribute information is the first attribute information or the second attribute information may be a graph indicating the first attribute information or a graph indicating the second attribute information. The first attribute information and the second attribute information may be stored on separate tables such that the first attribute information and the second attribute information are differentiated. The first attribute information may include multiple types of attribute information. As described below, the first attribute information includes the date of document creation and the creator (name) of the document. The second attribute information may include multiple types of attribute information. For example, as described below, the second attribute information includes a character string selected in response to user operation, a billing number, name of person in charge, and amount.

The first attribute information is the attribute information that the user, such as a document creator, is not enabled to assign. For example, the first attribute information is attribute information on the date of document creation and the document creator. The date of document creation is attribute information that is assigned on a storage date by a terminal, such as a personal computer, used by a user. This attribute information is not intentionally assigned by the user. The document creator is the attribute information assigned by a document creation program and is not intentionally assigned by the user. The user may be any person who is enabled to edit the contents of the document or the attribute information. For example, the user may be not only the document creator but also a document corrector, a proofreader, a person superior to the document creator, and or other related person.

The second attribute information is determined in accordance with the contents of the document. The user is enabled to assign or modify the second attribute information. For example, if the document is an image, character recognizing may be performed. Text resulting from recognizing the character image in the document may be the second attribute information. Results of image analysis and language processing on the character image in the document may be the second attribute information.

The phrase "the user is not enabled to assign" is intended to mean that the user has no right to select whether to assign the first attribute information when the first attribute information is assigned to the document. The user is not enabled to enter or modify the contents of the first attribute information. The phrase "the user is enabled to assign" is intended to mean that the user has the right to select whether to assign the second attribute information when the second attribute information is assigned to the document. In that case, the user is not necessarily enabled to enter or modify the contents of the second attribute information. If a user instruction to assign the second attribute information is provided, the contents of the attribute information may be a value extracted through character recognizing on the document of the image or through a key and value extraction operation. Specifically, a word extracted through the key and value extraction operation in accordance with a given rule may be automatically set to be the contents of the attribute information. This does not preclude the possibility that the user is enabled to enter or modify the contents of the attribute information.

The first attribute information is free from user intervention and thus fixed information. The second attribute information may be possibly different depending on user operation or performance of character recognition and is thus variable information. The first attribute information is hereinafter referred to as attribute A and the second attribute information hereinafter referred to as attribute B.

The second attribute information may be constructed as an attribute that is assigned to the document by document management software 300 described below. The first attribute information may be construed as an attribute that is assigned to the document by a module other than the document management software 300.

The program memory 120 stores a search module 135 and attribute assignment module 140.

The search module 135 performs first search on the attribute information on a document using the first attribute information in a search formula and second search using the second attribute information in the search formula.

There are three cases in which only the first attribute information is preset in the search formula, only the second attribute information is present in the search formula, and the first attribute information and second attribute information coexist in the search formula.

If the first attribute information and second attribute information coexist in the search formula, two searches are performed in accordance with the single search formula. The first search is performed on the attribute information on the document using the first attribute information in the search formula. The second search is performed on the attribute information on the document using the second attribute information in the search formula.

The search module 135 may perform third search on the full text of the document using the first attribute information and fourth search on the full text of the document using the second attribute information.

If the first attribute information and second attribute information coexist, the document memory module 125 performs four searches using the single search formula. The first and second searches have been previously described. The third search is performed on the full text of the document using the first attribute information in the search formula. The fourth search is performed on the full text of the document using the second attribute information in the search formula.

The search module 135 may perform the first and third searches in an exact match manner and the second and fourth searches in a partial match manner.

When the search module 135 performs each of the first search and the third search and if multiple search items are present, the search is performed with the search items set to required. When the search module 135 performs each of the second search and the fourth search and if multiple search items are present, the search is performed with the search items set to be optional. The search on the required condition is intended to mean that the search items are AND-gated. The search on the optional condition is intended to mean that the search items are OR-gated.

The search module 135 may prioritize the search results in response to the number of pieces of the first attribute information and the number of pieces of the second attribute information.

The prioritizing the search results is intended to mean that the search results are displayed in the order of degree of match with the search formula. For example, the search results having a higher priority may be displayed earlier in position on screen. For example, the search results may be displayed in different colors representing the priority order.

If the number of pieces of the first attribute information is zero, the search results are set to be none even if the number of pieces of the second attribute information is one or higher.

The search module 135 may prioritize the search results in accordance with a rule that is different from when the first attribute information is present in the search formula to when the first attribute information is not present in the search formula.

If the first attribute information is present in the search formula, the search results are set to be higher in priority order as the number of pieces of the first attribute information is larger and if the number of pieces of the first attribute information is larger, the search results are set to be higher in priority order as the number of the second attribute information is larger. The rule applied herein is a first rule. If the first attribute information is not present in the search formula, the search results are set to be higher in priority order as the number of pieces of the second attribute information is larger. The rule applied herein is a second rule.

The attribute assignment module 140 includes an attribute A assignment module 145 and attribute B assignment module 150. The attribute assignment module 140 assigns the attribute information to a document.

The attribute A assignment module 145 assigns the first attribute information to the document. As previously described, the attribute A assignment module 145 assigns as the first attribute information "date of document creation" the storage date of the document on which a document creation program on a personal computer (PC) has stored the document. The attribute A assignment module 145 may assign to the document the date on which the document reader 194 has read the document as the date of document creation. The document creation program may assign to the document the operator as a "document creator". When a document reading operation is performed, an operator who is logging in on the document reader 194 may be assigned as the document creator.

The attribute B assignment module 150 assigns the second attribute information to the document. For example, the attribute B assignment module 150 character-recognizes a character image within an image as a document and assigns to the document a text as character recognition results as the second attribute information. The attribute B assignment module 150 analyzes a positional relationship between the character recognition results and the character image in the image (more accurately the character image corresponding to the character recognition results), extracts a character string that is in a predetermined positional relationship with a predetermined character string, and assigns to the document the extracted character string.

Figure 2A:
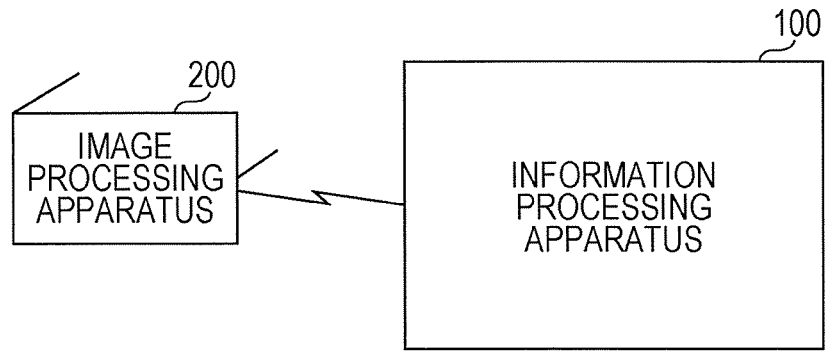
FIGS. 2A and 2B illustrate a system configuration of the exemplary embodiment.
Figure 2B:
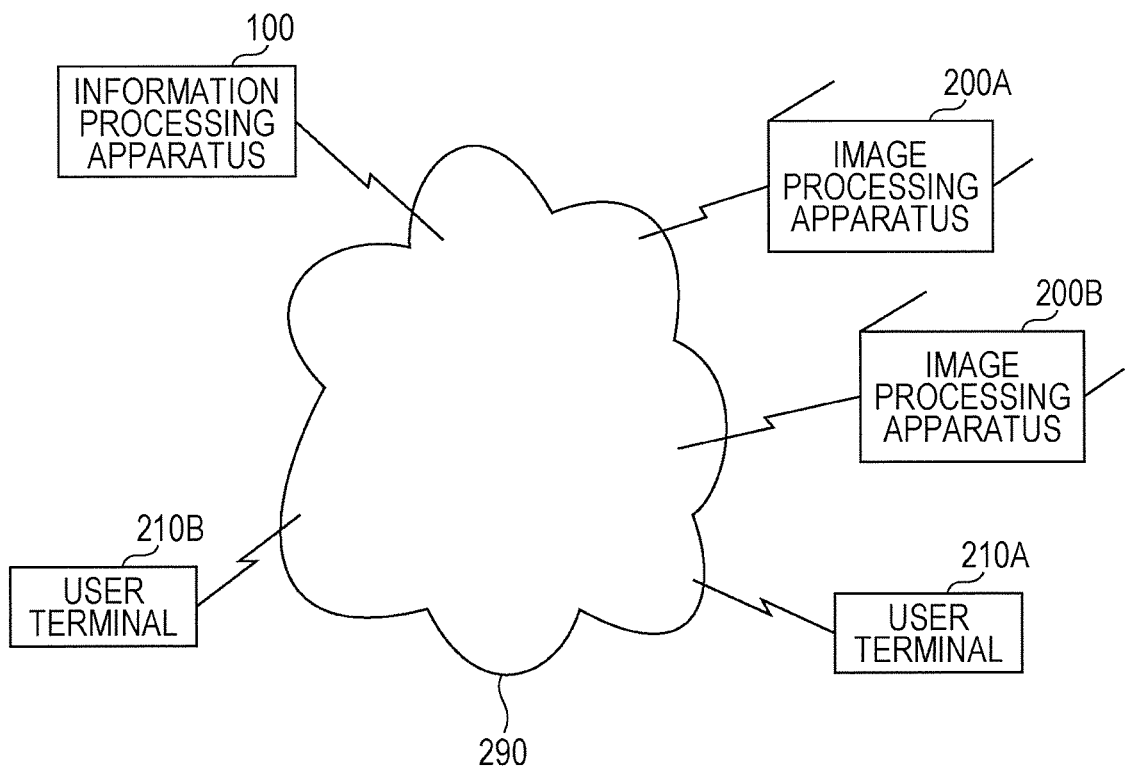

FIGS. 2A and 2B illustrate a system configuration using the exemplary embodiment.

FIG. 2A is a standalone system. The information processing apparatus 100 is connected to an image processing apparatus 200. The image processing apparatus 200 has a function of scanning a document and a printing function. For example, the image processing apparatus 200 is a multifunction apparatus. The information processing apparatus 100 implements the functions of the printer 189 and document reader 194 using the image processing apparatus 200. The information processing apparatus 100 may be internally arranged in the image processing apparatus 200 and the image processing apparatus 200 may perform search on documents.

FIG. 2B is a network system. The information processing apparatus 100, image processing apparatuses 200A and 200B, and user terminals 210A and 210B are connected to each other via a communication network 290. The communication network 290 may be a wireless network, a wired network, or a combination thereof. The communication network 290 may also be a communication infrastructure, such as the Internet or intranet. Alternatively, the function of the information processing apparatus 100 may be implemented using a cloud service.

In each of the systems in FIGS. 2A and 2B, a user reads a paper document using the scanner function of the image processing apparatus 200 and causes the information processing apparatus 100 to store the image of the document. When the image of the document is stored, the first attribute information and the second attribute information are assigned to the document. Using a user terminal 210, the user searches for the document stored on the information processing apparatus 100. For example, using the browser of the user terminal 210, the user connects the user terminal 210 to the information processing apparatus 100 and searches for the document through the function of the information processing apparatus 100.

The first attribute information and the second attribute information are assigned to the document not only when the document is read on the image processing apparatus 200. For example, when the user of the user terminal 210 transmits using the fax function the image of the document from the image processing apparatus 200A to the image processing apparatus 200B and causes the information processing apparatus 100 to store the image of the document received by the image processing apparatus 200B, the first attribute information and the second attribute information are also assigned to the document. When a document produced by the document creation program of the user terminal 210 is stored on the information processing apparatus 100, first attribute information and the second attribute information may be assigned to the document. The document received via the fax function and the document produced via the document creation program may also be a search target.

Figure 3:
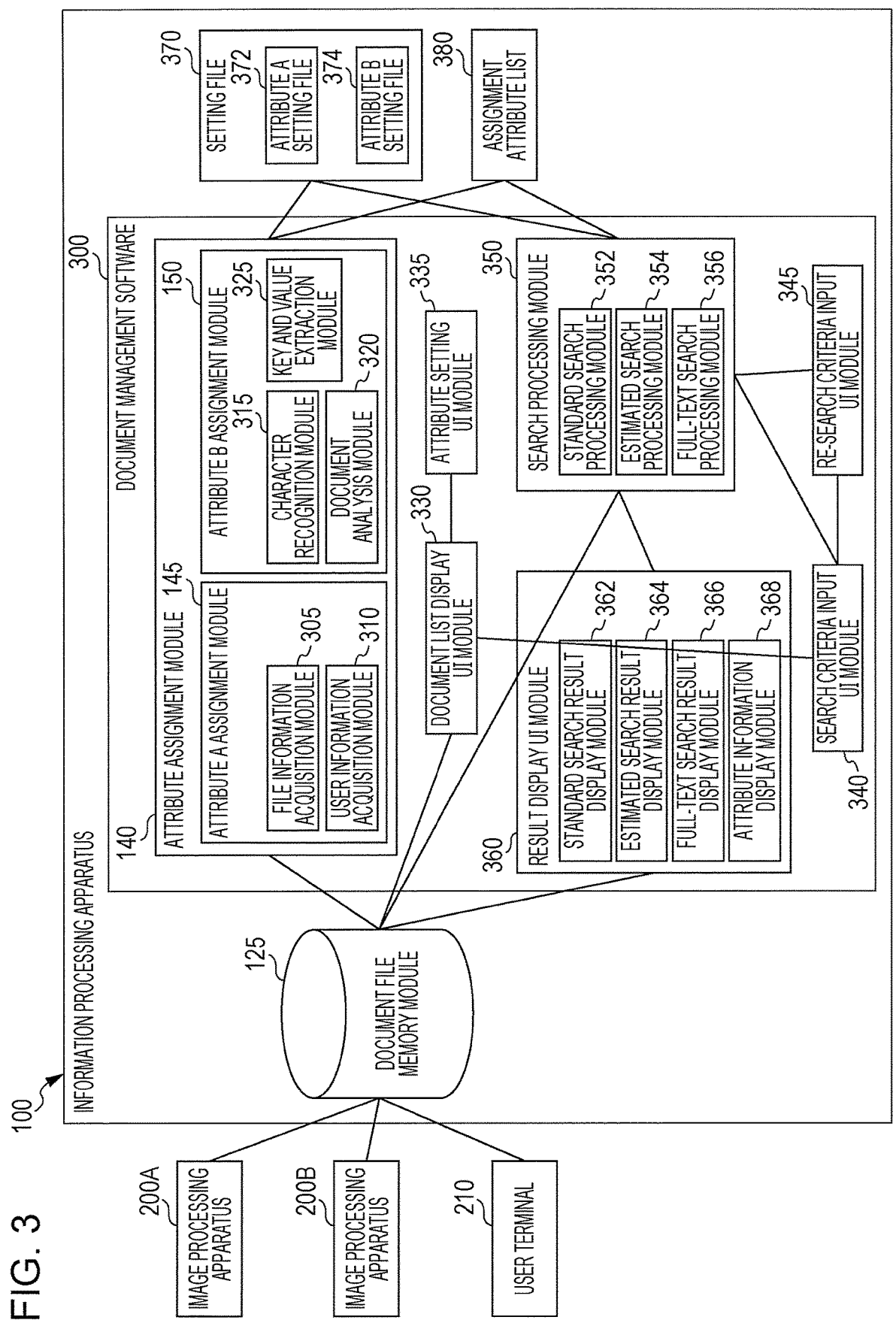
FIG. 3 illustrates a specific modular configuration of the exemplary embodiment.

FIG. 3 illustrates a specific modular configuration of the exemplary embodiment. The information processing apparatus 100 includes the document memory module 125, document management software 300, setting file 370, and assignment attribute list 380.

The document management software 300 is a specific example of a module in the program memory 120 in FIG. 1. A search processing module 350, result display user interface (UI) module 360, search criteria input UI module 340, and re-search criteria input UI module 345 respectively correspond to the search module 135.

The image processing apparatus 200A is connected to the document memory module 125 in the information processing apparatus 100. The image processing apparatus 200B is connected to the document memory module 125 in the information processing apparatus 100. The user terminal 210 is connected to the document memory module 125 in the information processing apparatus 100. The document read by the scanner of the image processing apparatus 200A or the document received via the fax function of the image processing apparatus 200B may be stored on the document memory module 125. The document produced by the document creation program of the user terminal 210 may be stored on the document memory module 125.

The document memory module 125 is connected to the image processing apparatus 200A, image processing apparatus 200B, and user terminal 210. The document memory module 125 is also connected to the attribute assignment module 140, document list display UI module 330, search processing module 350, and result display UI module 360 in the document management software 300.

The document management software 300 includes the attribute assignment module 140, document list display UI module 330, attribute setting UI module 335, search criteria input UI module 340, re-search criteria input UI module 345, search processing module 350, and result display UI module 360.

The attribute assignment module 140 includes the attribute A assignment module 145 and the attribute B assignment module 150 and is connected to the document memory module 125, setting file 370, and assignment attribute list 380.

The setting file 370 includes an attribute A setting file 372 and attribute B setting file 374 and is connected to the attribute assignment module 140 and search processing module 350 in the document management software 300.

The attribute A assignment module 145 includes a file information acquisition module 305 and user information acquisition module 310.

In accordance with the attribute A setting file 372, the attribute A assignment module 145 causes the file information acquisition module 305 and user information acquisition module 310 to acquire the first attribute information.

The file information acquisition module 305 acquires information on a file of a document as the first attribute information. For example, the date of document creation is the first attribute information.

The user information acquisition module 310 acquires information on the user as the first attribute information. For example, the document creator is the first attribute information.

The attribute B assignment module 150 includes a character recognition module 315, document analysis module 320, and key and value extraction module 325.

In accordance with the attribute B setting file 374, the attribute B assignment module 150 causes the character recognition module 315, document analysis module 320, and key and value extraction module 325 to acquire the second attribute information.

If the document is an image, the character recognition module 315 character-recognizes the character image in the document. The character recognition results are transferred to the document analysis module 320 and the key and value extraction module 325.

By analyzing the structure of the document, the document analysis module 320 extracts a character group written on a header or footer. The document analysis module 320 also extracts a large-size character group or a character group at a predetermined location as a title that is the second attribute information. For example, the second attribute information may include a header, a footer, and/or a title.

In accordance with a predetermined rule, the key and value extraction module 325 extracts as the second attribute information a character group extracted via a key and value extraction operation. For example, the second attribute information may include the billing number, name of person in charge, and/or amount.

Figure 14:
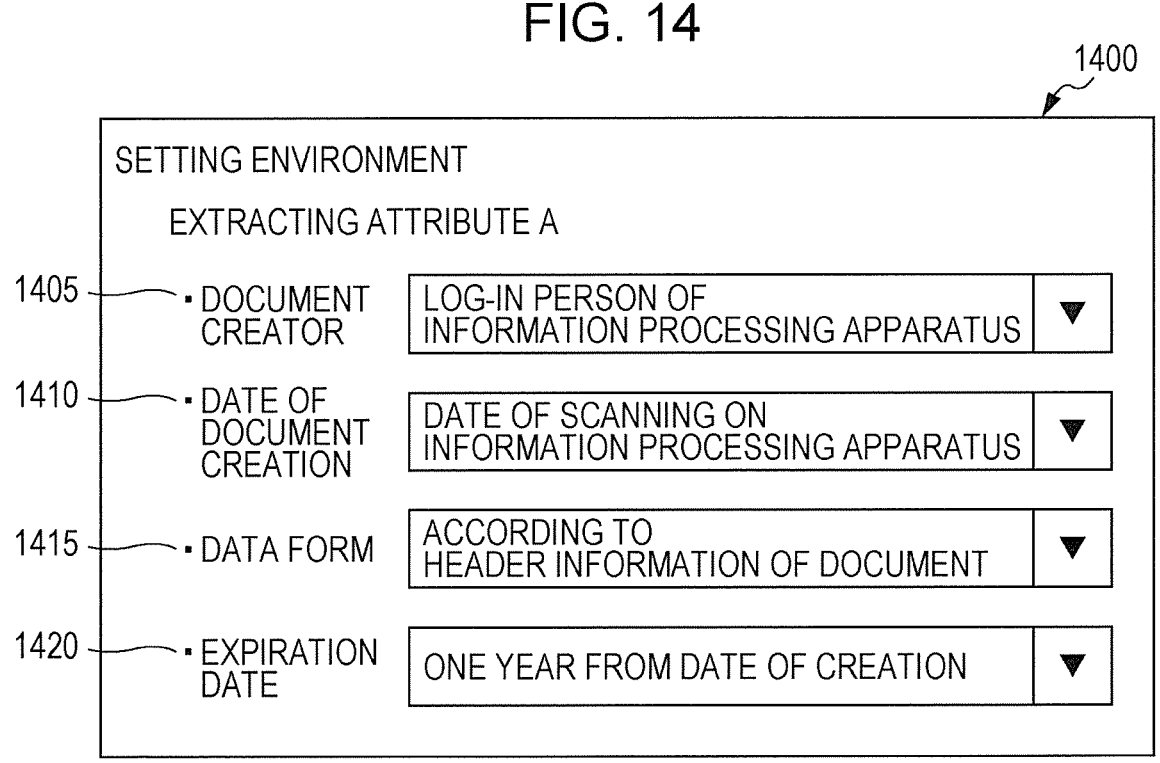
FIG. 14 illustrates a display example of an environment (attribute A extraction rule) setting screen.

The contents of the attribute A setting file 372 are set in an environment (attribute A extraction rule) setting screen 1400 in FIG. 14. The contents of the attribute B setting file 374 are set in a key and value extraction table 1500 in FIG. 15.

Figure 7:
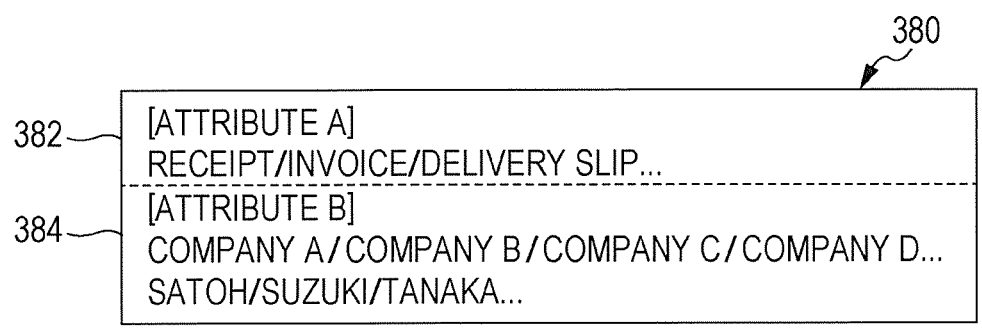
FIG. 7 illustrates a data structure of an assignment attribute list.

The assignment attribute list 380 is connected to the attribute assignment module 140 and search processing module 350 in the document management software 300. The assignment attribute list 380 stores the first and second attribute information assigned to the document. The contents of the assignment attribute list 380 are illustrated in FIG. 7.

The document list display UI module 330 is connected to the document memory module 125, attribute setting UI module 335, and search criteria input UI module 340. The document list display UI module 330 causes the display 187 to display in reduced size (or thumbnail display) a document stored on the document memory module 125.

The attribute setting UI module 335 is connected to the document list display UI module 330. The attribute setting UI module 335 displays in a way modifiable in response to user operation the first and second attribute information extracted related to the document displayed on the document list display UI module 330. The first and second attribute information confirmed by the user are thus assigned to the document.

The search criteria input UI module 340 is connected to the document list display UI module 330, re-search criteria input UI module 345, and search processing module 350. The search criteria input UI module 340 receives a search formula input by the user and causes the search processing module 350 to perform search.

The re-search criteria input UI module 345 is connected to the search criteria input UI module 340 and search processing module 350. After the search is performed by the search processing module 350, the re-search criteria input UI module 345 receives again the search formula input by the user and causes the search processing module 350 to perform the search.

The search processing module 350 includes a standard search processing module 352, estimated search processing module 354, and full-text search processing module 356 and is connected to the document memory module 125, search criteria input UI module 340, re-search criteria input UI module 345, result display UI module 360, setting file 370, and assignment attribute list 380. In accordance with the search formula of the search criteria input UI module 340, the search processing module 350 causes one or more of the standard search processing module 352, estimated search processing module 354, and full-text search processing module 356.

The standard search processing module 352 performs search on the document name of a document.

The estimated search processing module 354 performs search on the first attribute information and the second attribute information.

The full-text search processing module 356 performs research on the contents of the document (in a full-text search). The result display UI module 360 includes a standard search result display module 362, estimated search result display module 364, full-text search result display module 366, and attribute information display module 368 and is connected to the document memory module 125 and search processing module 350. The result display UI module 360 causes the display 187 to display the search results of the search processing module 350.

The standard search result display module 362 causes the display 187 to display the results of a search process of the standard search processing module 352.

The estimated search result display module 364 causes the display 187 to display the results of the search process of the estimated search processing module 354.

The full-text search result display module 366 causes the display 187 to display the results of the search process of the full-text search processing module 356.

The attribute information display module 368 causes the display 187 to display the first and second attribute information assigned to the document searched.

Figure 4:
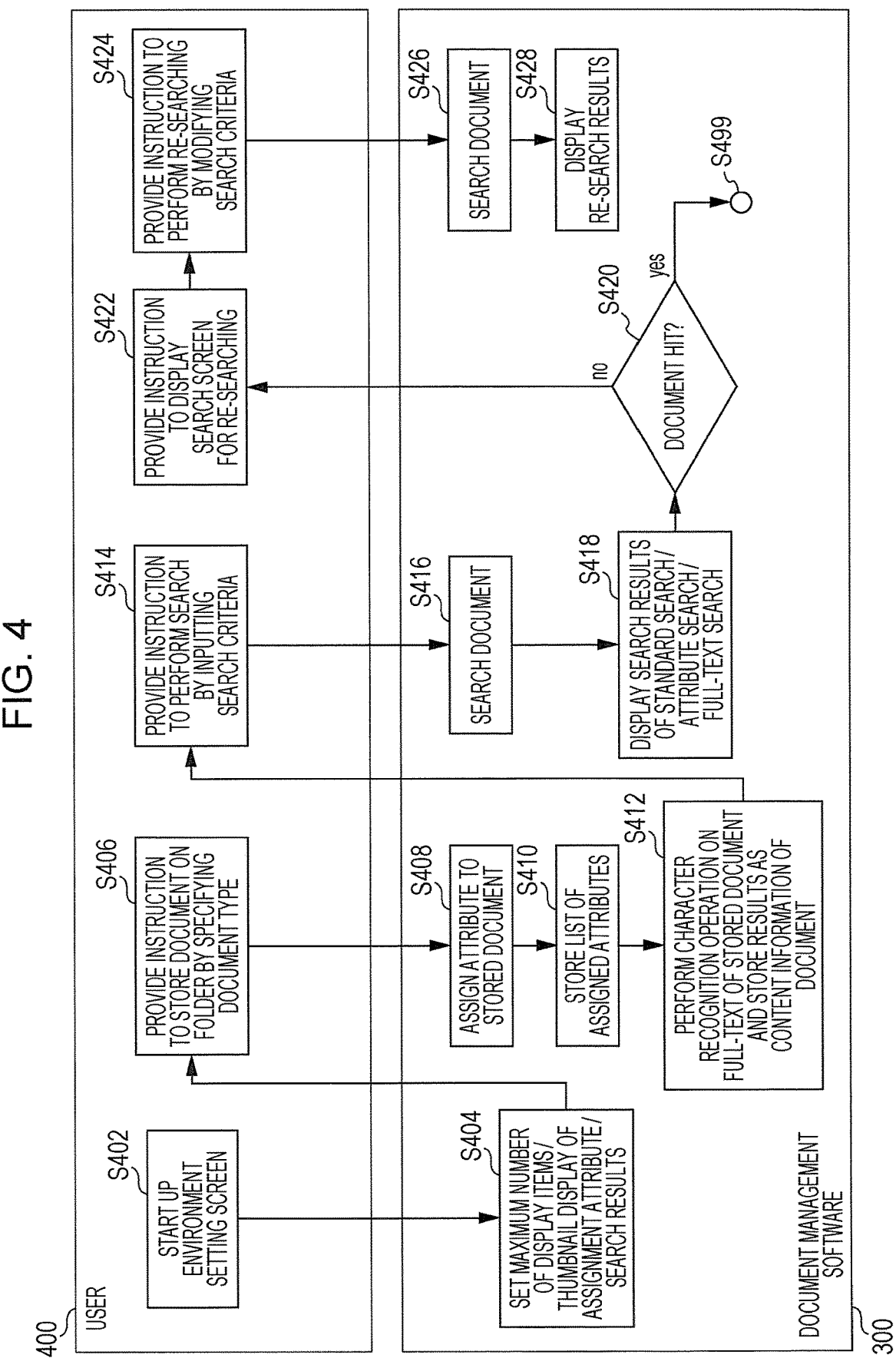
FIG. 4 is a flowchart illustrating a process example of the exemplary embodiment.

FIG. 4 is a flowchart illustrating a process example of the exemplary embodiment.

In step S402, the user 400 starts up an environment setting screen.

In step S404, the document management software 300 sets the maximum number of display items/thumbnail display of assignment attribute/search results.

In step S406, a user 400 provides an instruction to store a document in a folder by specifying a document type of the document.

In step S408, the document management software 300 assigns an attribute to the stored document.

In step S410, the document management software 300 stores a list of assigned attributes.

In step S412, the document management software 300 character-recognizes full texts of the stored documents and store recognition results as content information on the document.

In step S414, the user 400 provides an instruction to search by inputting a search criteria.

In step S416, the document management software 300 searches the document.

In step S418, the document management software 300 displays the search results of standard search, attribute search, and full-text search.

The document management software 300 determines in step S420 whether the document looked for is hit. If the document is hit, the process ends (step S499); otherwise, the process proceeds to step S422.

In step S422, the user 400 provides an instruction to display a search screen for re-searching.

In step S424, the user 400 provides an instruction to perform re-searching by modifying the search criteria.

In step S426, the document management software 300 searches the document.

In step S428, the document management software 300 displays re-search results.

Figure 5:
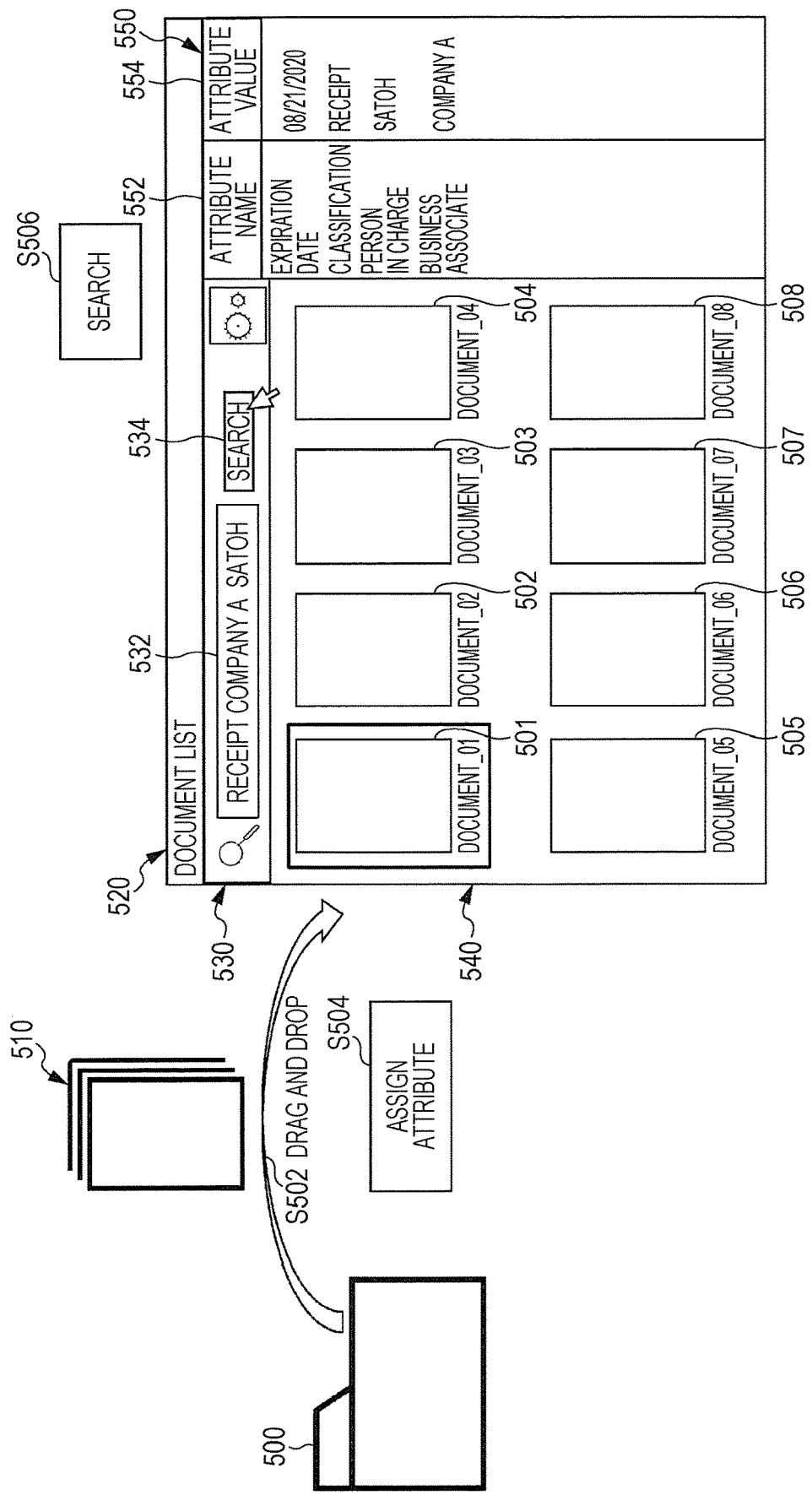
FIG. 5 illustrates a process example of the exemplary embodiment.

FIG. 5 illustrates a process example of the exemplary embodiment. FIG. 5 illustrates the process example in steps S406 and S414 in the flowchart in FIG. 4.

In step S502, the user performs a drag and drop operation (copying operation) on a document group 510 in a folder 500 to a document list screen 520.

In step S504, upon detecting the drag and drop operation, the attribute assignment module 140 assigns an attribute to each document in the document group 510 serving as a target.

The document list screen 520 includes a search region 530, document display region 540, and attribute display region 550.

The search region 530 displays a search keyword input box 532 and a search button 534.

The document display region 540 displays dragged and dropped documents 501 through 508 in a reduced size. A document name is displayed below a corresponding document.

The attribute display region 550 displays an attribute name column 552 and attribute value column 554. The attribute display region 550 displays the attribute name assigned to the document selected in response to user operation in the document display region 540 and the corresponding attribute value. Referring to FIG. 5, the document 501 is selected and the attribute name and the attribute value assigned to the document 501 are displayed in the attribute display region 550. Specifically, the first row of the attribute display region 550 indicates that the attribute name "expiration date" has the attribute value "08/21/2020", the second row indicates that the attribute name "classification" has the attribute value "receipt", the third row indicates that the attribute name "person in charge" has the attribute value "Satoh", and the fourth row indicates that the attribute name "business associate" has the attribute value "company A."

Through this process, a document management table 800 is assigned to each document. FIG. 8 illustrates a data structure of the document management table 800. The document management table 800 includes a document identification (ID) column 805, document name column 810, document creator column 815, date of document creation column 820, data form column 825, expiration date column 830, document type column 835, title column 840, name of person in charge column 845, and amount column 850.

The document ID column 805 stores information uniquely identifying each document (specifically, a document identification (ID)). The document name column 810 stores the name of each document. The document creator column 815 stores the name of the document creator. The date of document creation column 820 stores the date of document creation (year, month, day, hours, minutes, seconds, and subsecond or a combination thereof). The data form column 825 stores the data form of the document. The expiration date column 830 stores the expiration date of the document. The document type column 835 stores the type of the document. The title column 840 stores the title of the document. The name of person in charge column 845 stores the name of the person in charge of the document. The amount column 850 stores the amount of money of the document. For example, the attribute A corresponds to the document creator column 815, date of document creation column 820, data form column 825, expiration date column 830, and document type column 835. The attribute B corresponds to the title column 840, name of person in charge column 845, and amount column 850.

In step S506, the search processing module 350 performs document search in response to user operation.

For example, the user may enter "Receipt Company A Satoh" in the search keyword input box 532. In that case, the user does not have to be aware of the attribute A and the attribute B when the search keyword is entered. The search results are described with reference to FIG. 6.

The process in step S418 in the flowchart in FIG. 4 is described with reference to FIGS. 6 through 10.

Figure 6:
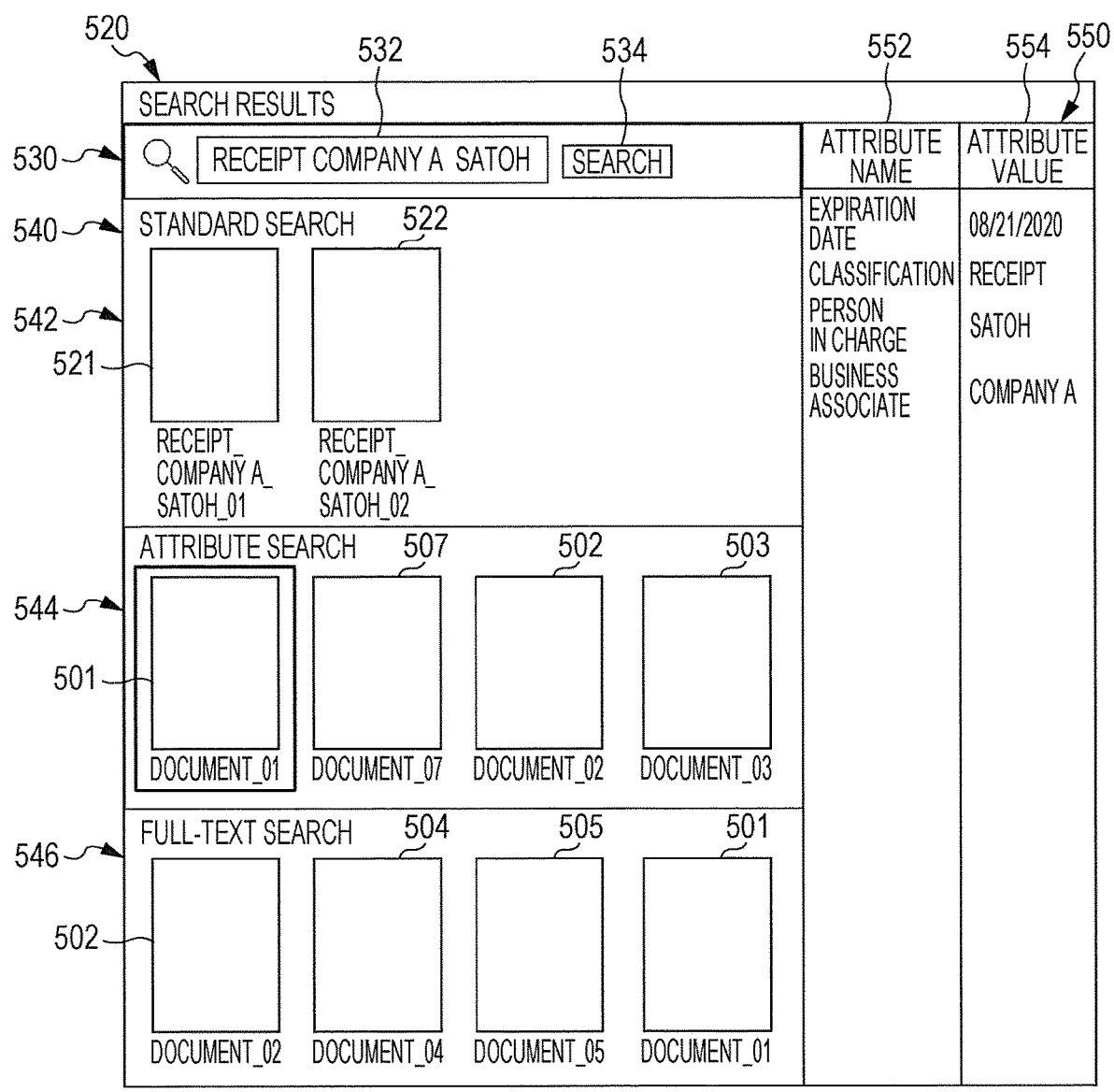
FIG. 6 illustrates a process example of the exemplary embodiment.

FIG. 6 illustrates a process example of the exemplary embodiment. Referring to FIG. 5, the value "Receipt Company A Satoh" is input in the search keyword input box 532 and the search button 534 is selected.

The document display region 540 is divided three regions (a standard search result display region 542, attribute search result display region 544, and full-text search result display region 546) and the divided regions are displayed. The search target is a document name in the standard search result display region 542. The search target is an attribute in the attribute search result display region 544. The search target is contents of the document in the full-text search result display region 546. The attribute search result display region 544 displays results of the first search and the second search and the full-text search result display region 546 displays results of the third search and the fourth search.

Documents 521 and 522 are displayed as the search results in the standard search result display region 542. The document names are searched for in this searching. If multiple search items ("Receipt," "Company A," and "Satoh") are present, the search is performed with the search times being required (namely, under an AND condition). The document having "Receipt," "Company A," and "Satoh" as the document names is research results. The document name of the document 521 is "Receipt_Company A_Satoh_01" and the document name of the document 522 is "Receipt_Company A_Satoh_02". The documents have each search item. The symbol "_" functions as a delimiter and is not a search target.

The attribute search result display region 544 displays, as the search results, documents 501, 507, 502, and 503. The searching that has been performed includes the first search that uses the attribute A in the search formula and the second search that uses the attribute B in the search formula. The first search is performed on each search item in an exact match manner. If multiple search items are present, each search item is required. The second search is performed on each search item in a partial match manner. If multiple search items are present, the search items are optional (or a OR condition).

A determination as to which search item input in the search keyword input box 532 is the attribute A or the attribute B is made using the assignment attribute list 380. FIG. 7 illustrates a data structure of the assignment attribute list 380. The assignment attribute list 380 stores an attribute A list 382 and an attribute B list 384. For example, the attribute A list 382 lists [attribute A] receipt/invoice/deliver_slip and the attribute B list 384 lists [attribute B] Company A/Company B/Company C/Company D/ . . . , Satoh/Suzuki/Tanaka . . . " In other words, the attribute A includes the receipt, invoice, delivery slip and so on, and the attribute B includes Company A, Company B, Company C, Company D, and so on and Satoh, Suzuki, Tanaka and so on. A determination as to which of the attribute A list 382 or the attribute B list 384 lists each search item is determined. If the search item belongs to the attribute A, the first search is performed. If the search item belongs to the attribute B, the second search is performed.

Out of search items "Receipt," "Company A," and "Satoh" input in the search keyword input box 532, the attribute A is "Receipt," and the attribute B is "Company A" and "Satoh". The first search is performed with the "Receipt" as an attribute in the exact match manner. The second search is performed with attributes as "Company A" and "Satoh" in the partial match manner and corresponds to searching with multiple search items. The search items are thus optional. In the second search, the attribute may be "Company A XXX" and "Satoh YY" or either "Company A" or "Satoh".

The attribute search result display region 544 may display a document that is first search results and second search results. The attribute search result display region 544 may display a document that is the first search results or the second search results. If the first search results are not present, the attribute search result display region 544 may not display any document even if the second search results are present.

The assignment attribute list 380 is predetermined. Alternatively, when an attribute is assigned, the assignment attribute list 380 may be created. For example, an attribute value may be extracted from the attribute name as the attribute A and added to the attribute A list 382. For example, the attribute name "Classification" is the attribute A and the attribute value "Receipt" is added to the attribute A list 382. The attribute value may be extracted from the attribute name as the attribute B and added to the attribute B list 384. For example, the attribute names "Person in charge" and "Business associate" are the attribute B and the attribute values "Satoh" and "Company A" are added to the attribute B list 384.

If the search item does not belong to any of the attributes A and B, that search item may be set to be unnecessary and searching may not be performed on that search item.

The assignment attribute list 380 may include only the attribute A list 382. In that case, if a search item other than the attribute A list 382 is present, that search item may be determined to be the attribute B.

The full-text search result display region 546 displays, as the search results, documents 502, 504, 505, and 501. The searching includes the third search that is performed on the contents of a document (full text) using the attribute A in the search formula and the fourth search that is performed using the attribute B in the search formula. The third search is performed on each search item in the exact match manner. If multiple search items are present, the search is performed with each search item under a required condition. The fourth search is performed on each search item in the partial match manner. If multiple search items are present, the search is performed with the search items under an optional condition.

The third search is an exact match search on the "Receipt" as an attribute. The fourth search is a partial match search with the "Company A" and "Satoh" as attributes. Since multiple search items are present, the search is performed under an optional condition.

The full-text search result display region 546 may display a document corresponding to search results of the third search and search results of the fourth search. The full-text search result display region 546 may display a document corresponding to the search results of the third search or the search results of the fourth search. If the results of the third search are not present, the full-text search result display region 546 may not display any document even if the results of the fourth search are present.

The priority order (display order) of the search results in the attribute search result display region 544 and the full-text search result display region 546 is described below.

The priority order of the search results having a higher number of the attributes A is higher. Given the same number of the attributes A, the priority order of the search results having a higher number of the attributes B is higher. The priority order is determined in accordance with a priority order determination table 900. FIG. 9 illustrates a data structure of the priority order determination table 900. The priority order determination table 900 includes a document ID column 905, the number of attributes A column 910, the number of attributes B column 915, and the priority order column 920.

The document ID column 905 stores a document ID as the search results (the search results of the first search and the second search or the search results of the third search and the fourth search). The number of attributes A column 910 stores the number of attributes A corresponding to the search item out of the attributes assigned to the document. The number of attributes B column 915 stores the number of attributes B corresponding to the search item out of the attributes assigned to the document. The priority order column 920 stores a priority order.

A document ID 0003 at the first row of the priority order determination table 900 indicates that the number of attributes A is "2", the number of attributes B is "1," and the priority order is "3." A document ID 0005 at the second row indicates that the number of attributes A is "2," the number of attributes B is "2," and the priority order is "2." A document ID 0001 at the third row indicates that the number of attributes A is "1," the number of attributes B is "3," and the priority order is "4." A document ID 0007 at the fourth row indicates that the number of attributes A is "0," the number of attributes B is "4," and the priority order is "not hit." A document ID 0011 at the fifth row indicates that the number of attributes A is "3," the number of attributes B is "0," and the priority order is "1."

The priority order determination table 900 displays the document ID 0011, the document ID 0005, the document ID 0003, and the document ID 0001 in that order. Specifically, in FIG. 6, the display order is from left to right in the attribute search result display region 544 or the full-text search result display region 546. A document ID 0007 does not have the attribute B and is thus not displayed.

The rule of the priority order of the search results may be changed depending on whether the search item includes the attribute A or not. If the search item includes only the attribute B, the attribute A is not present in the search item, and if the priority order is determined in accordance with the priority order determination table 900, no search results are preset. In such a case, the priority order is determined in accordance with the number of attributes B as in a priority order determination table 1000.

FIG. 10 illustrates a data structure of the priority order determination table 1000. The priority order determination table 1000 includes a document ID column 1005, number of attributes B column 1010, and priority order column 1015. The document ID column 1005 stores a document ID. The number of attributes B column 1010 stores the number of attributes B. The priority order column 1015 stores a priority order.

A document ID 0022 at the first row of the priority order determination table 1000 indicates that the number of attributes B is "5" and the priority order is "2." A document ID 0031 at the second row indicates that the number of attributes B is "3" and the priority order is "3." A document ID 0043 at the third row indicates that the number of attributes B is "0" and the priority order is "not hit." A document ID 0055 at the fourth row indicates that the number of attributes B is "10" and the priority order is "1." The priority order determination table 1000 displays the document ID 0055, the document ID 0022, and the document ID 0031 in that order. Specifically, referring to FIG. 6, the search results are displayed from left to right in the attribute search result display region 544 or the full-text search result display region 546. The document ID 0043 does not have the attribute B and is thus not displayed.

The process in step S404 in the flowchart in FIG. 4 is described with reference to FIGS. 11 through 15.

Figure 11:
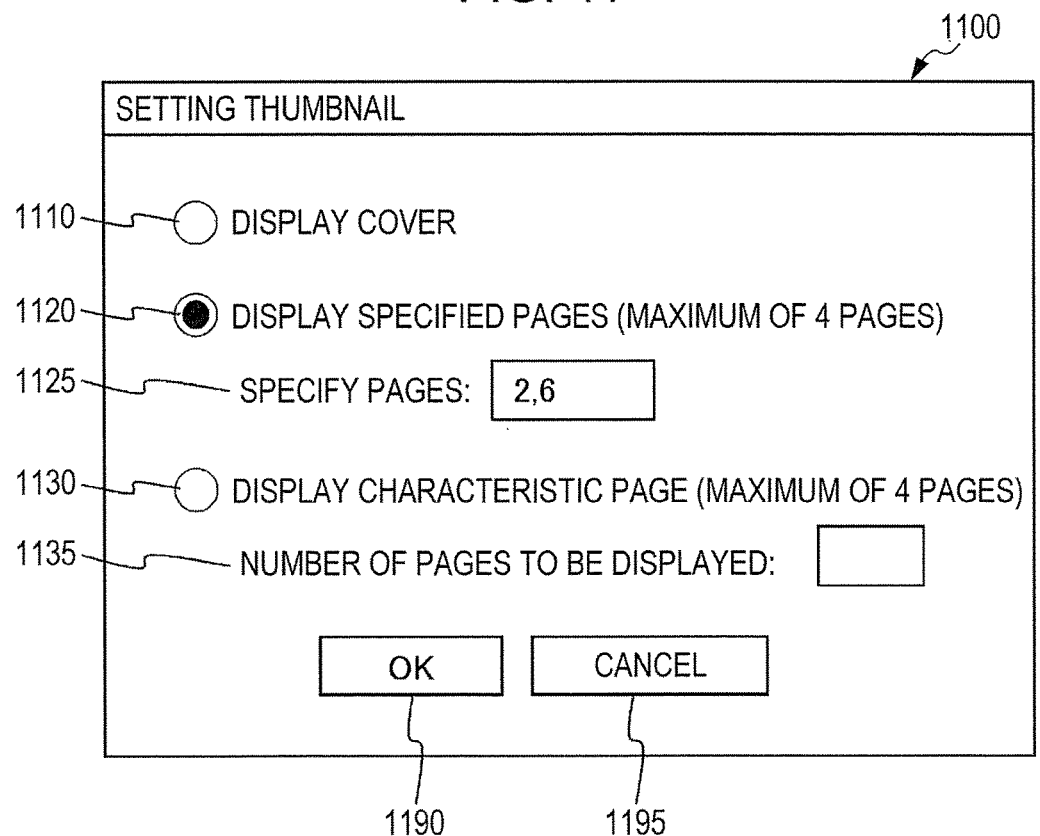
FIG. 11 illustrates a display example of a thumbnail setting screen.

FIG. 11 illustrates a process example of a thumbnail setting screen 1100. When the search results are displayed in a reduced size, the user may specify which page to display.

The thumbnail setting screen 1100 displays a display page choices 1110, 1120, and 1130, OK button 1190, and cancel button 1195. The display page choice 1120 includes a specified page column 1125 and the display page choice 1130 includes a display page count column 1135.

The display page choice 1110 displays "Display cover," the display page choice 1120 displays "Display specified pages (maximum of 4 pages)," and the display page choice 1130 displays "Display characteristic pages (maximum of 4 pages)." Specifically, three types of display pages are specified, including (1) cover, (2) specified pages, and (3) pages including a larger number of search items. The characteristic page refers to a page having a character string (search item) used in the search. The characteristic pages are displayed in the order of more to less appearances. If the attribute B is extracted from character recognition results in the search related to attributes (the first and second searches), the characteristic page is a page having the attribute B as a search item. In the search related to the full text (the third and fourth searches), the characteristic page is a page that contains a larger number of character strings used in the search.

If the OK button 1190 is selected in response to user operation, a display target page is displayed with one of the display page choice 1110, the display page choice 1120, and the display page choice 1130 selected. If the cancel button 1195 is selected in response to user operation, the screen reverts back to a default value or a preset state.

Figure 12:
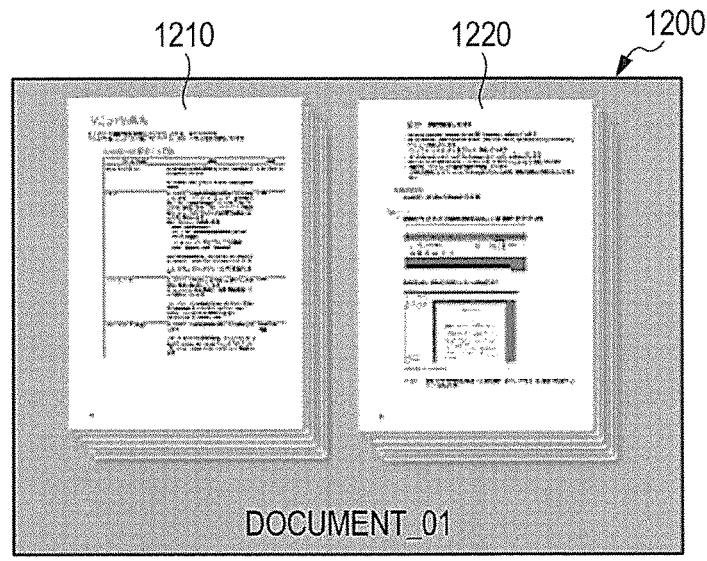
FIG. 12 illustrates a display example of a thumbnail display screen.

FIG. 12 illustrates a display example of a thumbnail display region 1200.

The thumbnail display region 1200 is displayed if two pages are specified in the specified page column 1125 in FIG. 11 or when if pages are specified in the display page count column 1135.

The thumbnail display region 1200 is a thumbnail display region for one document and may display multiple pages. The thumbnail display region 1200 may remain the same in size regardless of whether a single page or multiple pages are displayed or may be increased in size if multiple pages are displayed.

Figure 13:
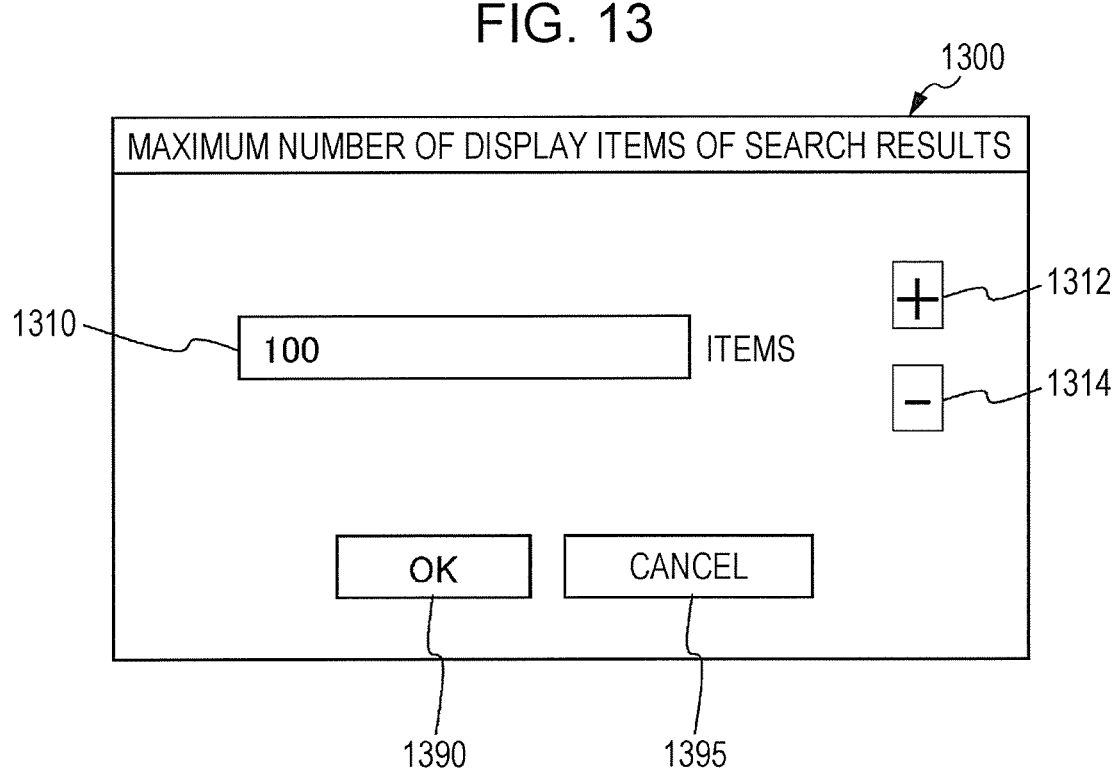
FIG. 13 illustrates a display example of a maximum display item screen of search results.

FIG. 13 illustrates a display example of a maximum display item screen 1300 of search results. When the search results are displayed, a maximum number of display items may be specified.

The maximum display item screen 1300 of the search results displays a maximum specified display item region 1310, increase button 1312, decrease button 1314, OK button 1390, and cancel button 1395.

The maximum specified display item region 1310 displays a default value or a value input in response to user operation. The number of items in a thumbnail document 1210 is increased or decreased respectively by the increase button 1312 or the decrease button 1314. If the OK button 1390 is selected in response to user operation, the value in the maximum specified display item region 1310 is maximized. If the cancel button 1395 is selected in response to user operation, the screen reverts back to a default value or a preset state.

FIG. 14 illustrates a display example of an environment (attribute A extraction rule) setting screen 1400 used to set an extraction rule of the attribute A.

The environment (attribute A extraction rule) setting screen 1400 is displayed to determine a rule (the attribute A setting file 372) to extract the attribute A.

The environment (attribute A extraction rule) setting screen 1400 includes a document creator column 1405, date of document creation column 1410, data form column 1415, and expiration date column 1420.

A rule to extract the document creator as the attribute A is set in the document creator column 1405. For example, the document creator may be an operator of the image processing apparatus 200 (namely, a log-in person of the image processing apparatus 200), an operator of the user terminal 210, or an operator of a document creation program if the document is produced using the document creation program. A rule to extract the date of document creation as the attribute A is set in the date of document creation column 1410. For example, the date of document creation is a date of scanning on the image processing apparatus 200. If the document is created using the document creation program, the date of document creation may be a storage date of the document created by the document creation program. A rule to extract a data form of the document is set in the data form column 1415. For example, the data form may be set according to header information on the document. Furthermore, the data form may be set in accordance with settings at the reading performed by the image processing apparatus 200. For example, the settings at the reading may include resolution, color or monochrome when the document is scanned. A rule to set an expiration date is set in the expiration date column 1420. For example, the expiration date may be one year from the date of creation. Furthermore, the expiration date may be indefinite or not applicable.

FIG. 15 illustrates a data structure of a key and value extraction table 1500 used to determine an extraction rule of the attribute B.

In the key and value extraction table 1500 in FIG. 15, an example of a rule to extract a predetermined character string and a character string at a predetermined positional relationship with the predetermined character string is illustrated. The key and value extraction table 1500 includes a key column 1505 and a value extraction rule column 1510. The key column 1505 stores a key that is the predetermined character string. The value extraction rule column 1510 stores a value extraction rule.

The first row of the key and value extraction table 1500 indicates as a rule 1 that a billing number as a key is a value extraction rule that extracts, as invoice sheet number, alphanumerical letters of 10 digits to the right of the billing number. The optional function of the image processing apparatus 200 or the information processing apparatus 100 extracts an attribute in accordance with the key and value extraction table 1500. Specifically, a character image of the document is character-recognized. If a character string in the key column 1505 is present in the character recognition results, an attribute value is extracted in accordance with the rule in the value extraction rule column 1510. In this way, the predetermined character string and the character string having the predetermined positional relationship with the predetermined character string are thus extracted.

Figure 16A:
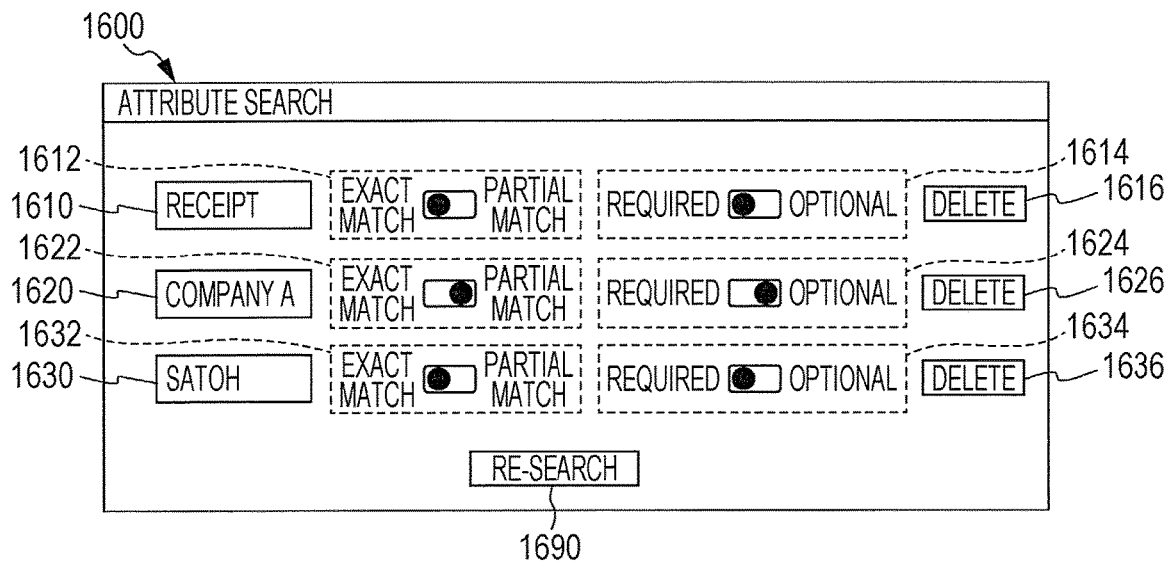
FIGS. 16A and 16B illustrate a process example of the exemplary embodiment.
Figure 16B:
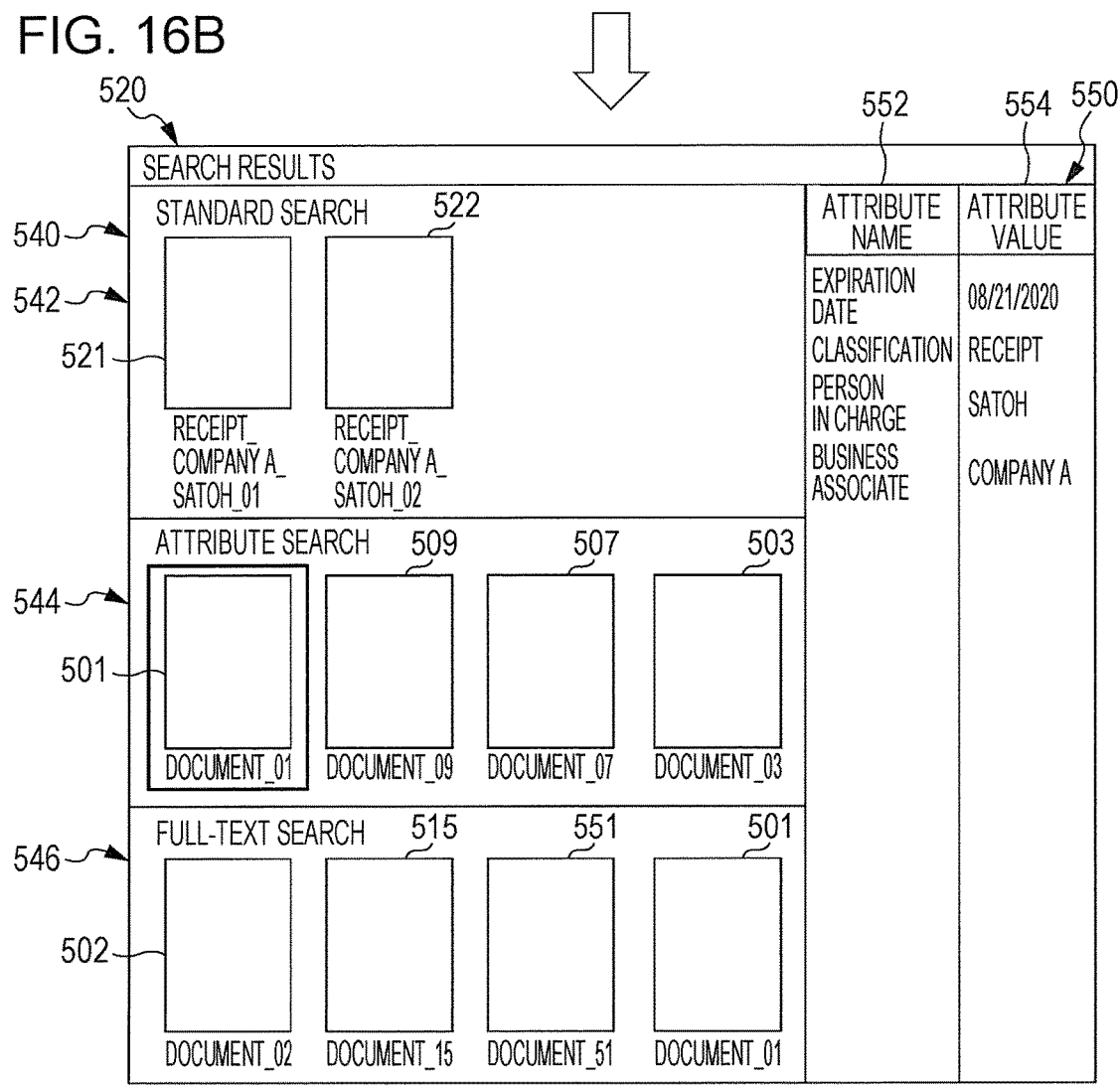

FIGS. 16A and 16B illustrate a process example of the exemplary embodiment. Referring to FIGS. 16A and 16B, the process in step S422 in the flowchart in FIG. 4 is described. The user interface during re-search and the display example of the re-search results are illustrated herein.

In a first searching, the first and third searches are in the exact match and if multiple search items are present, the search items are required. The second and fourth searches are in the partial match and if multiple search items are present, the search items are optional. In such searching, the user may be unable to extract a desired document. According to the exemplary embodiment, the searching may be performed in the user interface for re-searching with the exact match or the partial match modified and with the required condition or the optional condition modified.

FIG. 16A illustrates the user interface in the re-search. An attribute search (re-search) screen 1600 displays search keyword input columns 1610, 1620, and 1630, and a re-search button 1690.

The first row of the attribute search (re-search) screen 1600 displays the search keyword input column 1610 with the previous search item "Receipt", exact or partial match designate column 1612, required or optional designate column 1614, and delete button 1616. The second row displays the search keyword input column 1620 with the previous search item "Company A", exact or partial match designate column 1622, required or optional designate column 1624, and delete button 1626. The third row displays the search keyword input column 1630 with the previous search item "Satoh", exact or partial match designate column 1632, required or optional designate column 1634, and delete button 1636. In the previous search, all the search items searched are displayed.

Since the first row is the attribute A as a default value, the exact or partial match designate column 1612 is an exact match, the required or optional designate column 1614 is a required condition. Since the second and third rows are the attribute B, the exact or partial match designate column 1622 and the exact or partial match designate column 1632 are a partial match, and the required or optional designate column 1624 and the required or optional designate column 1634 are an optional condition. The user may modify these settings. If the delete button 1616, the delete button 1626, and/or the delete button 1636 are selected in response to user operation, the corresponding search item(s) is deleted. If a re-search button 1690 is selected, the search is performed again in accordance with the settings at each row.

FIG. 16B illustrates a user interface for the re-search and illustrates documents different from those in FIG. 6 in a display order different from that in FIG. 6. Specifically, the attribute search result display region 544 displays documents 501, 509, 507, and 503 in that order. The full-text search result display region 546 displays documents 502, 515, 551, and 501 in that order.

The attribute search (re-search) screen 1600 illustrated in FIG. 16A specifies the search related to the attributes and contents of the document. Similarly, in the search related to the document name of the documents as well, the exact or partial match may be modified and/or the required or optional condition may be modified. Through the re-search, the documents and the display order may change in the standard search result display region 542 as well.

The exact or partial match may be modified and/or the required or optional condition may be modified separately when the search is performed on the attributes of the document to when the search is performed on the contents of the document. For example, if the modification is made only on the search on the attributes of the documents, the documents and the display order of the document may change only in the attribute search result display region 544 through the re-search.

Figure 17:
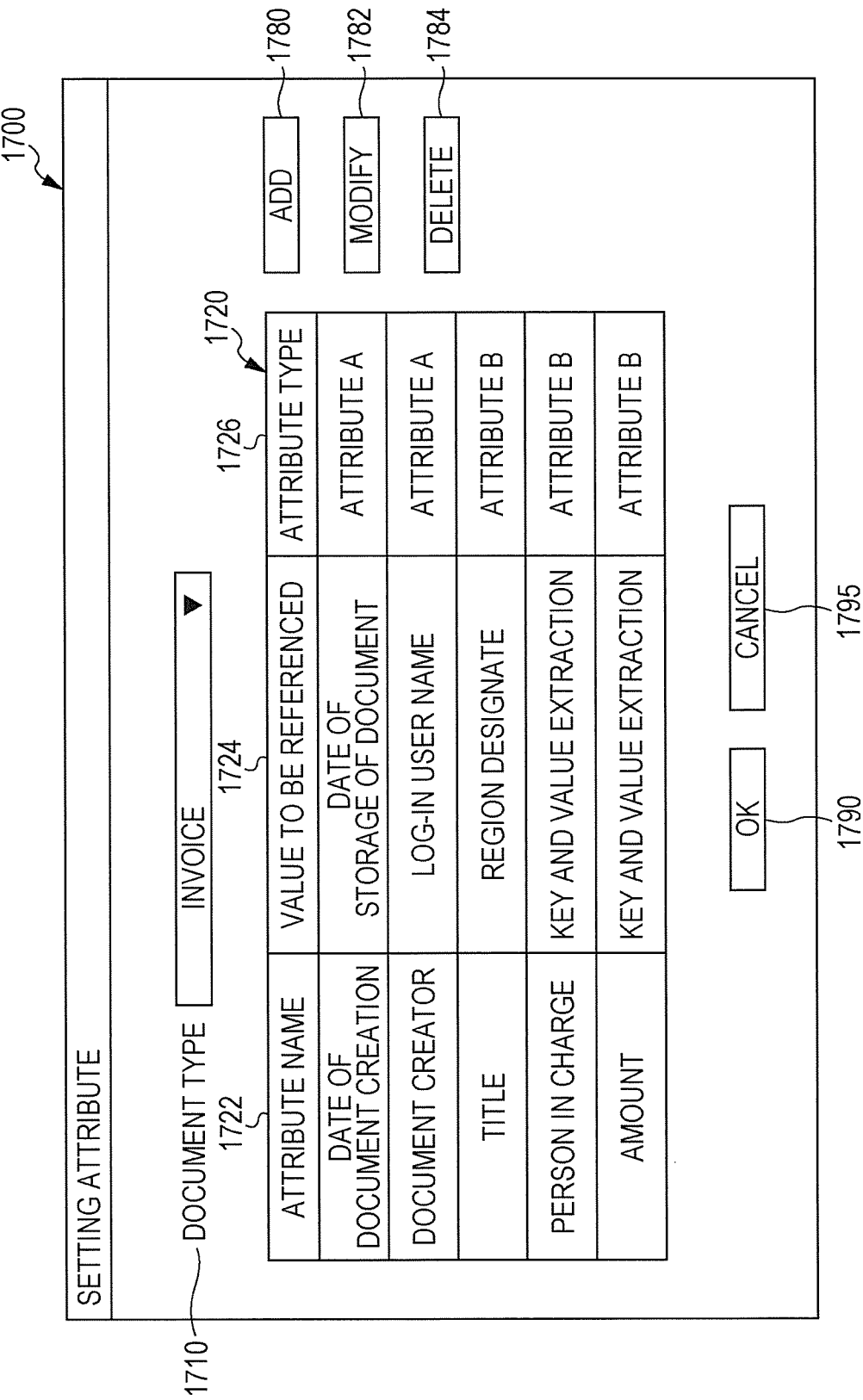
FIG. 17 illustrates a display example of an attribute setting screen.

FIG. 17 illustrates a display example of an attribute setting screen 1700 in which the attribute to be assigned to a document is specified in response to user operation.

The attribute setting screen 1700 displays a document type setting column 1710, attribute setting management table 1720, add button 1780, modify button 1782, delete button 1784, OK button 1790, and cancel button 1795.

The attribute setting management table 1720 includes an attribute name column 1722, reference value column 1724, and attribute type column 1726. The attribute name column 1722 displays an attribute name, the reference value column 1724 displays an attribute value of the attribute name, and the attribute type column 1726 displays the attribute type of the attribute name.

The first row of the attribute setting management table 1720 displays the date of document creation at the attribute name column 1722, the date of storage of document at the reference value column 1724, and the attribute A at the attribute type column 1726. Specifically, the attribute "the date of creation of document" has as an attribute value the date on which the target document is stored and is the attribute A that the user is unable to intentionally assign to the document.

The second row displays a document creator at the attribute name column 1722, a log-in user name at the reference value column 1724, and the attribute A at the attribute type column 1726. Specifically, the attribute "the document creator" has as an attribute value the log-in user name and is the attribute A.

The third row displays a title at the attribute name column 1722, a region designate at the reference value column 1724, and the attribute B at the attribute type column 1726. Specifically, the attribute "the tile" has as an attribute value a character string within a region specified in response to user operation (the attribute values is a character string selected in response to user operation if the document is a text or the attribute value is results of character recognition of a character image within a region specified by the user if the document is an image) and is the attribute B that the user is enable to assign.

The fourth row displays the name of a person in charge at the attribute name column 1722, a key and value extraction at the reference value column 1724, and the attribute B at the attribute type column 1726. Specifically, the attribute "the name of the person in charge" has as an attribute value a character string that is extracted via a key and value extraction operation with a character string to the right of a location of a phrase "in charge" being as "the name of person in charge" and is the attribute B that the user is enable to assign.

The fifth row displays an amount at the attribute name column 1722, a key and value extraction at the reference value column 1724, and the attribute B at the attribute type column 1726. Specifically, the attribute "the amount" has as an attribute value a character string that is extracted via a key and value extraction operation with a character string to the right of a location of a phrase "total sum" being as "the amount" and is the attribute B that the user is enable to assign.

If the add button 1780 is selected in response to user operation, an attribute may be added to the attribute setting management table 1720. If the modify button 1782 is selected in response to user operation, the contents of the selected attribute (one row of the attribute setting management table 1720) may be modified. Although the values in the attribute type column 1726 may be modifiable by a privileged user, such as an administrator and is designed such that an ordinary user may not be allowed to modify the value. Depending on the attribute, the type of attributes (the attribute A and the attribute B) may be fixed. If the delete button 1784 is selected, the selected attribute may be deleted. Only the attribute B may be added, modified, or deleted and the addition, modification, and deletion of the attribute A may be inhibited.

If the OK button 1790 is selected in response to user operation, an attribute set in the attribute setting management table 1720 is assigned to the document type specified in the document type setting column 1710. If the cancel button 1795 is selected in response to user operation, the display reverts back to the default value or pre-set state.

The program described above may be provided in the recorded form on a recording medium or via a communication medium. The program described above may be construed as a computer readable non-transitory recording medium storing the program.

The computer readable non-transitory recording medium refers to as a recording medium that is used to install, execute, and/or distribute the program.

The recording media include digital versatile disk (DVD), compact disk (CD), Blu-ray disc (registered trademark), magnetooptical disk (MO), flexible disk (FD), magnetic tape, hard disk, read-only memory (ROM), electronically erasable and programmable read-only memory (EEPROM (registered trademark)), flash memory, random-access memory (RAM), and secure digital (SD) memory card. The DVDs include "DVD-R, DVD-RW, and DVD-RAM" complying with the standard formulated by the DVD forum, and "DVD+R and DVD+RW" complying with DVD+RW standards. The CDs include read-only CD (CD-ROM), recordable CD-R, and rewritable CD-RW.

The program in whole or in part may be stored on the recording medium for storage and distribution. The program in whole or in part may be transmitted via a transmission medium. The transmission media include a wired network, a wireless network, or a combination thereof. The wired and wireless networks may include a local-area network (LAN), metropolitan-area network (MAN), wide-area network (WAN), the Internet, intranet, and/or extranet. The program in whole or in part may be transmitted over a carrier wave.

The program may be part or whole of another program, or may be stored on the recording medium together with another program. The program may be split and the split programs may then be separately stored on the recording media. The program may be processed in any fashion before being stored as long as the program remains restorable. For example, the program may be compressed or encrypted before storage.

In the exemplary embodiment above, the term "processor" refers to hardware in a broad sense. Examples of the processor include general processors (e.g., CPU: Central Processing Unit), and dedicated processors (e.g., GPU: Graphics Processing Unit, ASIC: Application Specific Integrated Circuit, FPGA: Field Programmable Gate Array, and programmable logic device).

In the exemplary embodiment above, the term "processor" is broad enough to encompass one processor or plural processors in collaboration which are located physically apart from each other but may work cooperatively. The order of operations of the processor is not limited to one described in the exemplary embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a memory storing, in an associated form, attribute information assigned to a document and information that indicates whether the attribute information is first attribute information that a user is not enabled to assign or second attribute information that the user is enabled to assign; and
   one or a plurality of processors configured to:
     perform first search on the attribute information on the document using the first attribute information in a search formula, second search on the attribute information on the document using the second attribute information in the search formula, third search on a full text of the document using the first attribute information, and fourth search on the full text of the document using the second attribute information;
     accept an input of the search formula in a same search area for the first search, the second search, the third search, and the fourth search; and
     display a search result of the first search and the second search in a first area, and display a search result of the third search and the fourth search in a second area, wherein the first area and the second area are separately displayed in a same display area.

2. The information processing apparatus according to claim 1, wherein the one or a plurality of processors are configured to perform each of the first search and the third search in in an exact match manner and perform each of the second search and the fourth search in a partial match manner.

3. The information processing apparatus according to claim 1, wherein the one or a plurality of processors are configured to
   perform, if a plurality of search items are used, each of the first search and the third search in a manner that sets the search items to be required, and
   perform, if a plurality of search items are used, each of the second search and the fourth search in a manner that sets the search items to be optional.

4. The information processing apparatus according to claim 1, wherein the one or a plurality of processors are configured to prioritize search results in accordance with a number of matches with the first attribute information and a number of matches with the second attribute information.

5. The information processing apparatus according to claim 4, wherein the one or a plurality of processors are configured to set the search results to be none if the number of matches with the first attribute information is zero and the number of matches with the second attribute information is one or more.

6. The information processing apparatus according to claim 4, wherein the one or a plurality of processors are configured to prioritize the search results in accordance with a rule that is different from when the first attribute information is present in the search formula to when the first attribute information is not present in the search formula.

7. A non-transitory computer readable medium storing a program causing a computer to execute a process for processing information, the process comprising:
- storing, in an associated form, attribute information assigned to a document and information that indicates whether the attribute information is first attribute information that a user is not enabled to assign or second attribute information that the user is enabled to assign;
- performing first search on the attribute information on the document using the first attribute information in a search formula, second search on the attribute information on the document using the second attribute information in the search formula, third search on a full text of the document using the first attribute information, and fourth search on the full text of the document using the second attribute information;
- accepting an input of the search formula in a same search area for the first search, the second search, the third search, and the fourth search; and
- displaying a search result of the first search and the second search in a first area, and displaying a search result of the third search and the fourth search in a second area, wherein the first area and the second area are separately displayed in a same display area.

8. An information processing apparatus comprising:
- means for storing, in an associated form, attribute information assigned to a document and information that indicates whether the attribute information is first attribute information that a user is not enabled to assign or second attribute information that the user is enabled to assign; and
- means for performing first search on the attribute information on the document using the first attribute information in a search formula, second search on the attribute information on the document using the second attribute information in the search formula, third search on a full text of the document using the first attribute information, and fourth search on the full text of the document using the second attribute information;
- means for accepting an input of the search formula in a same search area for the first search, the second search, the third search, and the fourth search; and
- means for displaying a search result of the first search and the second search in a first area and displaying a search result of the third search and the fourth search in a second area, wherein the first area and the second area are separately displayed in a same display area.

* * * * *